US006932994B1

(12) United States Patent
Gladin et al.

(10) Patent No.: US 6,932,994 B1
(45) Date of Patent: Aug. 23, 2005

(54) METHOD FOR PRODUCING AN ICED FOOD PRODUCT SUCH AS AN ICED LOLLIPOP

(75) Inventors: Alain Gladin, Haguenau (FR); Alain Picquet, Strasbourg (FR)

(73) Assignee: Mars, Incorporated, McLean, VA (US)

( * ) Notice: Subject to any disclaimer, the term of this patent is extended or adjusted under 35 U.S.C. 154(b) by 312 days.

(21) Appl. No.: 10/111,366

(22) PCT Filed: Oct. 5, 2000

(86) PCT No.: PCT/FR00/02767

§ 371 (c)(1),
(2), (4) Date: Jul. 19, 2002

(87) PCT Pub. No.: WO01/26477

PCT Pub. Date: Apr. 19, 2001

(30) Foreign Application Priority Data

Oct. 8, 1999 (FR) .................................. 99 12560

(51) Int. Cl.[7] ............................................... A23P 1/10
(52) U.S. Cl. ...................... 426/101; 426/302; 426/307; 426/565; 426/389; 426/515; 426/524
(58) Field of Search ................................ 426/100, 101, 426/302, 307, 565, 389, 512, 515, 524

(56) References Cited

U.S. PATENT DOCUMENTS

| 2,120,640 | A | * | 6/1938 | Craemer ...................... 426/130 |
| 4,073,411 | A | * | 2/1978 | Doumani ..................... 222/192 |
| 4,081,257 | A | | 3/1978 | Lassmann et al. |
| 4,420,496 | A | * | 12/1983 | Hanson et al. ............... 426/609 |
| 4,700,547 | A | | 10/1987 | Hayashi |
| 4,980,192 | A | * | 12/1990 | Finkel ......................... 426/631 |
| 5,358,727 | A | | 10/1994 | Yates et al. |
| 5,382,149 | A | | 1/1995 | Yates et al. |
| 5,472,482 | A | * | 12/1995 | Willits et al. .................. 106/2 |

FOREIGN PATENT DOCUMENTS

| EP | 0864256 | | 10/1998 | |
| EP | 000986959 | A1 * | 3/2000 | ............ A23G 9/02 |

* cited by examiner

*Primary Examiner*—Drew Becker
(74) *Attorney, Agent, or Firm*—Fitzpatrick, Cella, Harper & Scinto

(57) ABSTRACT

The inventive method for producing an iced food product that comprises of depositing a mixture containing water and a polyol on the inner face of a mold and arranging a substance which constitutes the food product in contact with the mixture in the mold.

20 Claims, 3 Drawing Sheets

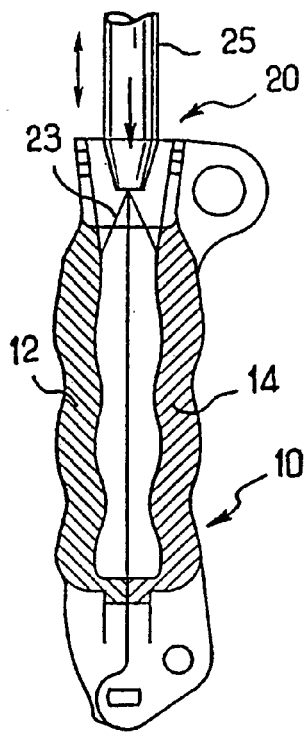
FIG_1
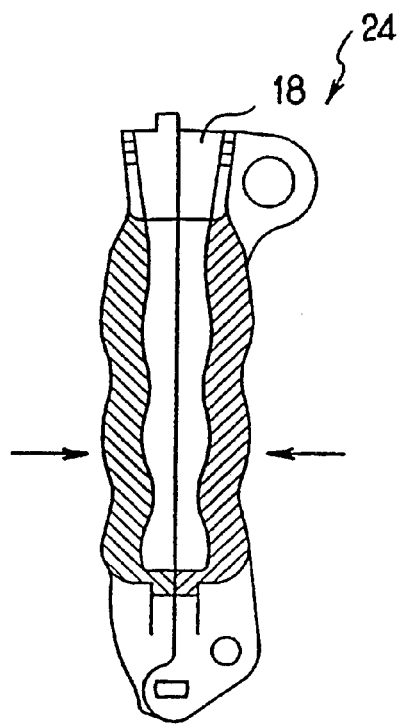
FIG_2
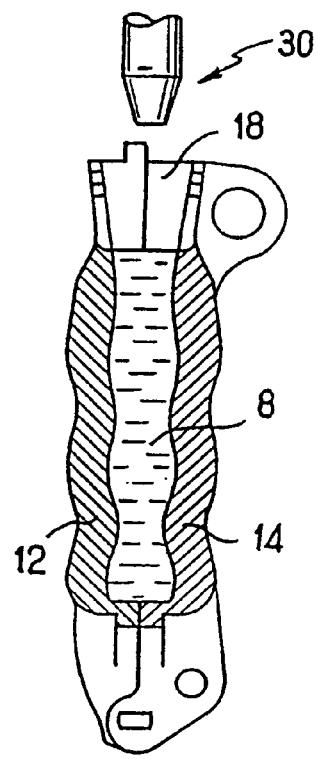
FIG_3
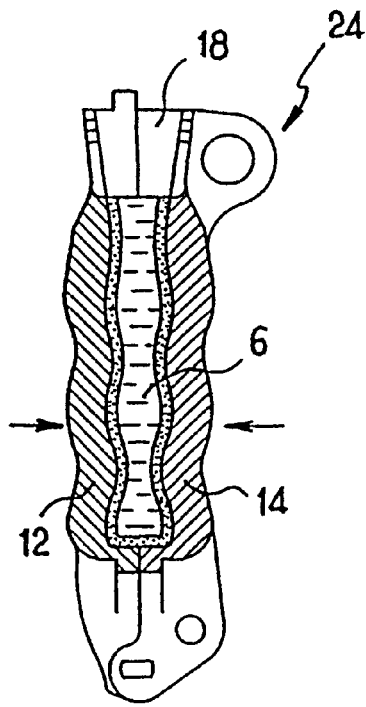
FIG_4
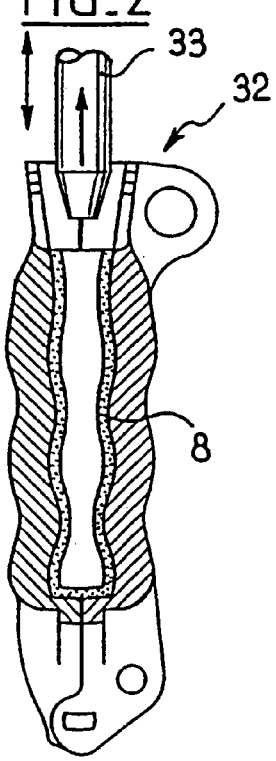
FIG_5
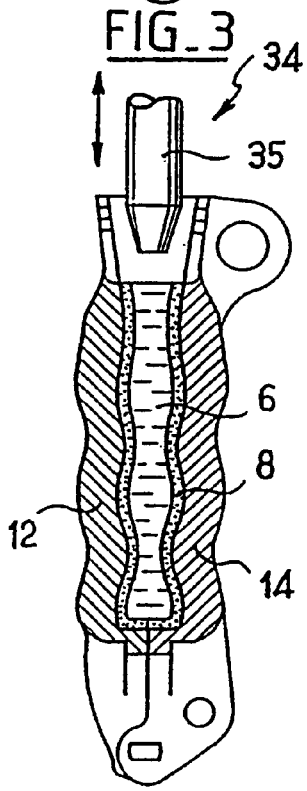
FIG_6

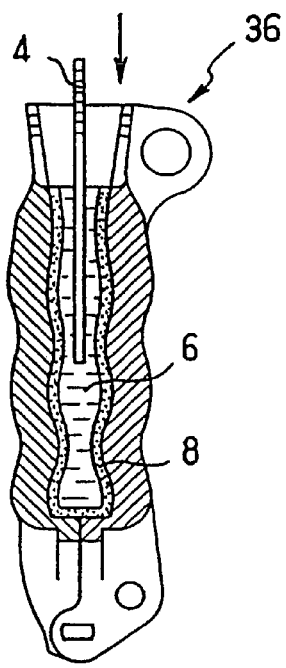
FIG_7
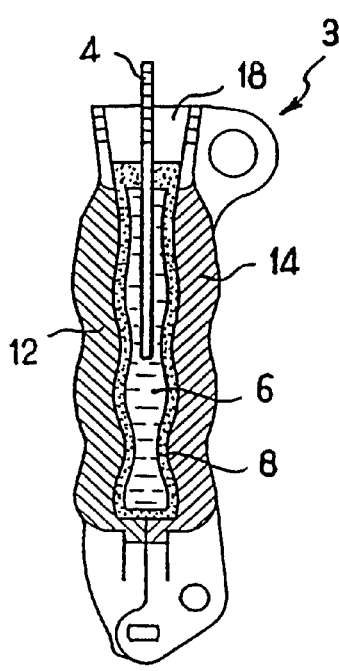
FIG_8
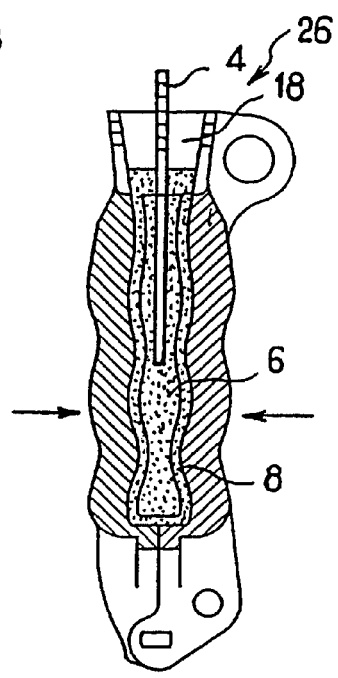
FIG_9
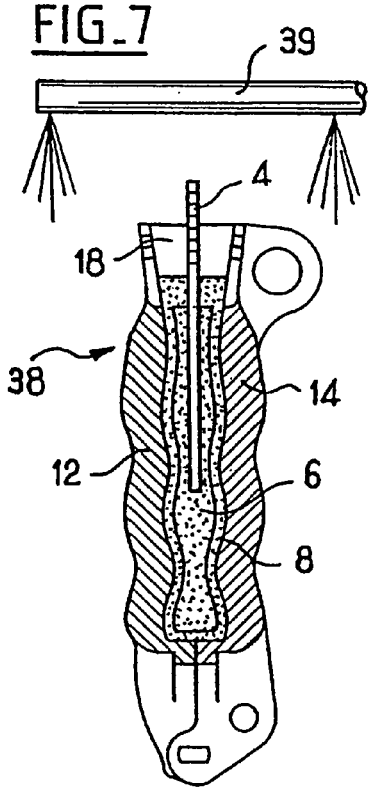
FIG_10
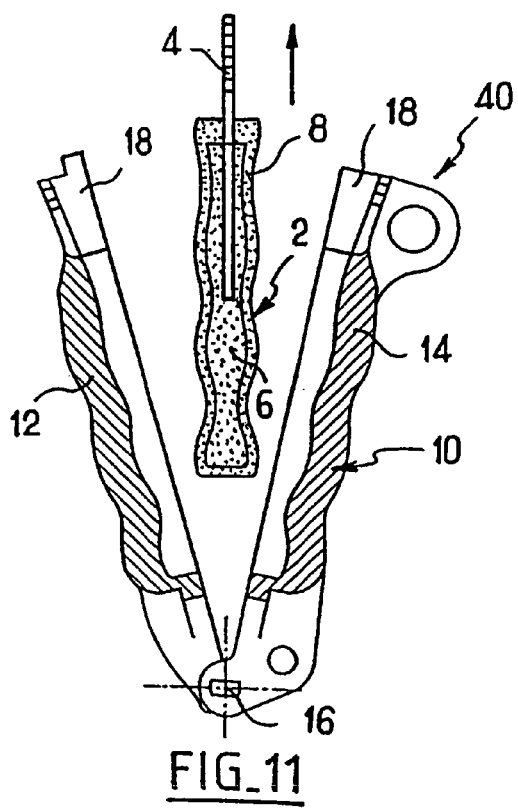
FIG_11

METHOD FOR PRODUCING AN ICED FOOD PRODUCT SUCH AS AN ICED LOLLIPOP

BACKGROUND OF THE INVENTION

1. Field of the Invention

The invention relates to iced food products, especially sweet products, such as iced jollies with a sorbet and/or ice cream base.

2. Related Background Art

A method of manufacturing an iced lolly in which a mold is cooled to −100° C. and the mold is filled with an aqueous solution intended to form a portion of the iced lolly is known from document EP-0 864 256. The hardening of this solution in contact with the cold mold forms a hard crust. Next, the unhardened central fraction of the solution is sucked out, then the residual part of the mold is filled with an ice cream composition which is left to harden completely, always at −100° C. Finally, the iced lolly is demolded so that it can be packaged and stored.

This method has the advantage that it makes it possible to obtain an iced lolly having a very accurately defined outer shape and which can, for example, have reliefs such as fruit shapes. In addition, this method does not reheat the iced lolly for the purpose of demolding. However, the main drawback of this method is that the temperature of the mold at −100° C. involves a very low temperature in the production line environment. Knowing that operators must be able to intervene at any moment on this line, this involves working conditions, which are very difficult to withstand. Furthermore, the implementational means to maintain such a low temperature require very heavy investment, which increases the cost of the product.

SUMMARY OF THE INVENTION

One aim of the invention is to provide a manufacturing method making it possible to obtain products whose shape is very accurately defined and which can be implemented in a working environment with a more acceptable temperature.

For the purpose of achieving this aim, provision is made according to the invention for a method of producing an iced food product, comprising steps consisting in depositing, on an inner face of a mold, a mixture comprising water and a polyol; and placing a substance forming the food product in contact with the mixture in the mold.

BRIEF DESCRIPTION OF THE DRAWINGS

FIG. 1 is a cross-sectional view of the empty mold with the interior cavity surfaces coated by the water-polyol mixture from a nozzle.

FIG. 2 is a cross-sectional view of the empty mold in FIG. 1 in preparation for cooling.

FIG. 3 is a cross-sectional view of the mold filled to the lower edge of the skirt with the coating sorbet.

FIG. 4 is a cross-sectional illustration of the hardened coating sorbet in a shell-like contour around the surface of the mold's interior cavity.

FIG. 5 is a schematic diagram of the remaining liquid coating sorbet within the mold removed from the inner core by a vacuum pump.

FIG. 6 is a cross-sectional view of the coated mold in FIG. 5 filled with the inner sorbet by a nozzle.

FIG. 7 is a schematic diagram of a stick inserted into the inner sorbet of the mold in FIG. 6.

FIG. 8 is a cross-sectional view of the mold in FIG. 7 with the skirt portion partially filled by the coating sorbet.

FIG. 9 is a cross-sectional view of the mold in FIG. 8 with hardened inner sorbet.

FIG. 10 is schematic diagram of reheating turbines passing hot air over the mold in FIG. 9.

FIG. 11 is a cross-sectional schematic diagram of the mold in FIG. 10 opened longitudinally at its bottom pivot joint into component halves, with the iced food product extracted by a grasping device.

DETAILED DESCRIPTION OF THE INVENTION

Figure 12:
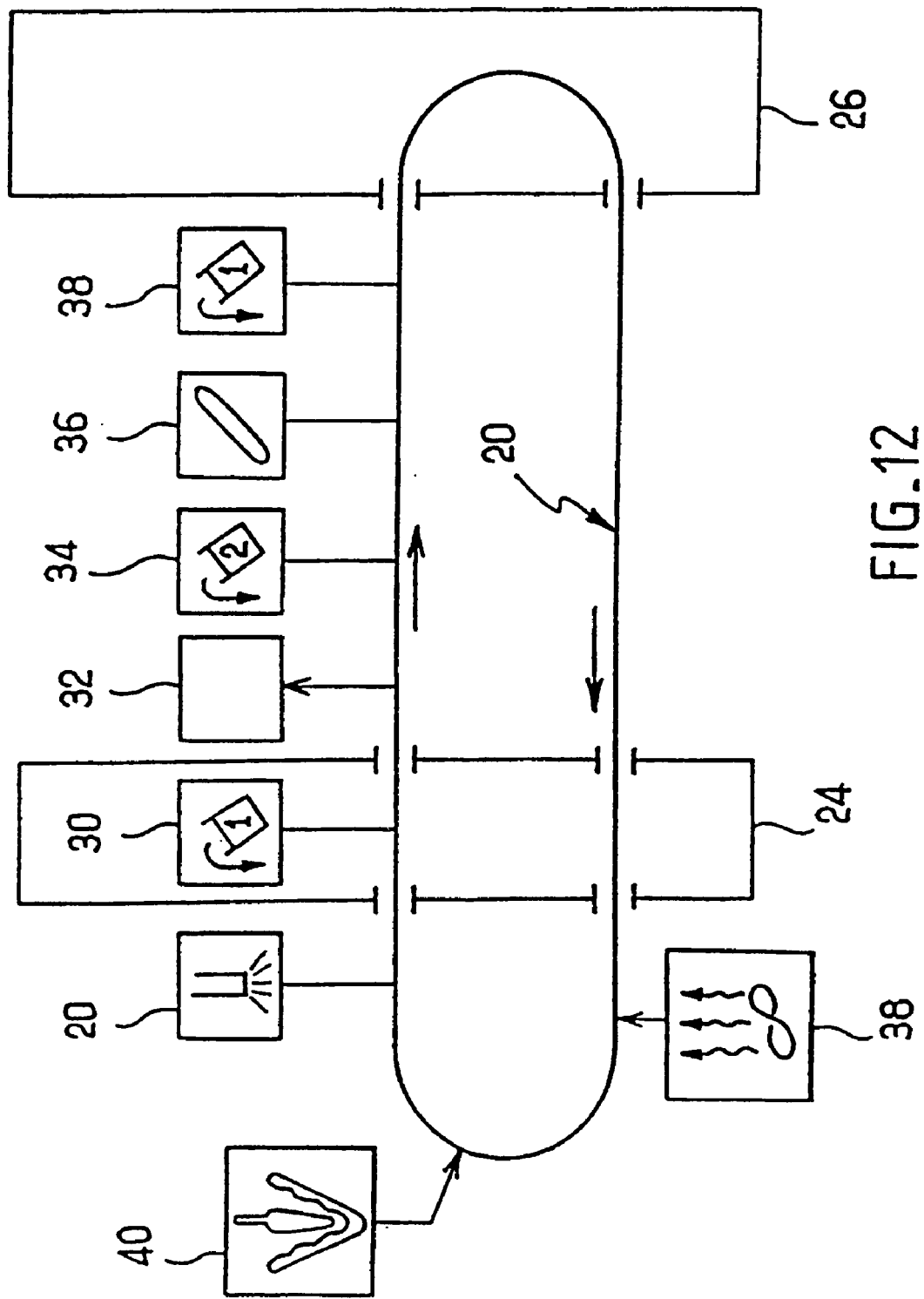
FIG. 12 is a schematic illustration of the production plant with each station.

Thus, the mixture constitutes a demolding agent which makes it possible to demold the product at very low temperatures, for example less than −10° C., or even −15° C. Demolding at such a temperature does not initiate melting of the product on the surface. Therefore, a product having a very accurately defined shape, which can in particular have relief or hollow designs of very high accuracy is obtained. In addition, the mixture makes it possible to manufacture the product at temperatures, which are reasonable and compatible with the conditions usually encountered in the cold production lines. It impairs neither the taste nor the appearance of the product. It avoids subjecting the product to significant reheating generating thermal shock. These advantages arise especially from the high viscosity of the mixture in comparison with that of water and from its relatively low melting point compared with that of water.

Advantageously, the mixture consists of water and of the polyol.

Advantageously, the mixture comprises a mass percentage of between 0.8x and 1.2x of the polyol where x is the mass percentage of the polyol in the eutectic mixture.

The particularly low melting point of such a mixture, which is close to the eutectic mixture, makes the latter specially capable of acting as a demolding agent.

Advantageously, the mixture is a eutectic mixture.

Advantageously, the polyol is chosen from the group consisting of: glycerol, maltitol and sorbitol.

Glycerol, which is inexpensive, is particularly preferred.

Advantageously, the mixture is a eutectic mixture of water and of glycerol.

Advantageously, the product is given a demolding temperature such that, when the product is being demolded, the mixture is at least partly liquid and the substance is completely solid.

Advantageously, the demolding temperature is less than 0° C., and preferably less than −5° C.

Advantageously, the demolding temperature is less than −10° C., and preferably less than −15° C.

Advantageously, at least part of the product is produced at a production temperature less than the demolding temperature.

Advantageously, the production temperature is less than −15° C. and preferably less than −25° C.

Advantageously, the mixture is deposited by spraying.

According to the invention, a product having been manufactured by means of the method according to the invention is also provided.

Again, according to the invention, a plant for producing an iced food product, comprising means for depositing, on one inner face of a mold, a mixture comprising water and a polyol, and means for placing a substance forming the food product in contact with the mixture in the mold are also provided.

Other characteristics and advantages of the invention will become further apparent in the following description of a preferred embodiment given by way of nonlimiting example, in the appended drawings:

FIGS. 1 to 11 illustrate various steps of the method in the present implementational example; and FIG. 12 is a schematic view of a plant according to the invention.

In the present implementational example, an iced lolly 2 with a fruit sorbet base on a stick 4 is manufactured by means of the method. With reference to FIG. 11, the iced lolly 2 comprises, at its center, a swollen sorbet 6, with a smooth texture in which pieces of fruit are incorporated. Furthermore, it comprises an unswollen coating sorbet 8, which is harder than the central sorbet 6, which it completely covers. These two sorbets 6, 8 with the stick 4 constitute the iced lolly.

Here, the term "sorbet" refers to a substance obtained by freezing a mixture of water and of sugar, flavored using fresh fruits or their equivalent in the form of frozen, atomized or freeze-dried fruits or fruit juice. The iced lolly may, for example, be in tropical fruit, strawberry or orange/lemon flavors. The coating sorbet 8 is stabilized by means of polysaccharides and has a dry material content of 20 to 25%.

In the present implementational mode, the plant illustrated in FIG. 12 is used. This plant comprises metal molds 10 illustrated in FIGS. 1 to 11 and comprising, on the surface, an aluminum layer deposited by an electrochemical method (anodized aluminum), which gives the mold a good surface condition. Each mold 10 has a complex shape, generally a rectilinear elongate shape, which is taller than it is wide, and wider than it is thick. The mold has two main inner faces having cavities representing, for example, strawberries, blackcurrants, oranges or other fruits intended to generate corresponding reliefs on the iced lolly 2. These cavities give the mold a very large internal area with respect to its volume. This large area increases the contact surface between the mold 10 and the iced lolly 2 and, in other circumstances, could prove to be critical during demolding, in the sense that portions of the iced lolly could remain attached to the mold. The method according to the invention avoids this difficulty.

With reference to FIG. 11, the mold 10 comprises two half-molds 12, 14, each defining a major face of the iced lolly. These two parts come into contact along a vertical joining plane lying substantially along the thickness of the iced lolly 2. The two half-molds 12, 14 are mounted so as to pivot one with respect to the other about a lower horizontal axis 16, located at a lower end of the mold away from the upper filling end 18 adjacent to the stick. Here, the mold has a height of 104 mm, a width of 48 mm and a thickness of 20 mm. The upper end 18, or skirt, has, in vertical section, a trapezoidal shape which gets narrower toward the bottom and, in horizontal section, a rectangular shape. This end 18 makes it possible to compensate for fluctuations in amounts and volumes during the crystallization of the sorbets.

The plant comprises a conveyor belt 50 which moves the molds 10 along a closed oval path illustrated in FIG. 12.

The plant comprises two cooling tunnels 24, 26, each one cooled by an internal cold air fan. The molds 10 pass through the tunnel 24 over the two rectilinear portions of their path. The molds pass through the tunnel 26 during one of the two curved parts of their path, between the outward route and the return route.

In the outward route, in the upper part of FIG. 12, the tunnel 24 cools the mold before and during dosage. On the return route, it keeps the mold and the product at temperature. The tunnel 26 keeps the product at temperature during the curved portion of the path. The temperature in the first tunnel 24 is, in this case, −27° C. and that in the second tunnel is −31° C.

Each of the stations of the plant will now be described by following the manufacture of each iced lolly.

With reference to FIG. 1, at the station 20 before entering the tunnel 24 and located on the outward route, the inside of the empty mold 10 is sprayed with a water and glycerol solution 23 by means of a nozzle 25, for example by means of a nozzle 25 sold by the name of "DÖBÖR".

The polyols mixed with water have the property, of having a eutectic point for a given mixture composition. In some binary mixtures, the interactions between the molecules cause a decrease of the melting point which becomes much less than that of the components taken separately. For a certain mixture composition, the minimum melting point is obtained. This particular point is called a eutectic point or a eutectic mixture. For the polyols, these interactions are due to the hydrogen bonds, which are created between the alcohol and water functional groups. In this case, the solution has the proportions of the eutectic mixture (but could have proportions close to this mixture). For glycerol, the proportions of the eutectic mixture are, by mass, 66.7% glycerol and 33.3% water. With such a mixture, it is possible to demold the iced lolly 2, without reheating, at a mold temperature of −39° C. or more. However, as will be seen below, the present implementational mode comprises a reheating step and carries out the demolding at a higher temperature in order to reduce the amount of mixture injected into each mold. As a variant, the mixture could comprise up to 75% glycerol (which makes it possible to demold without heating up to −34° C.) or up to 55% glycerol (which allows demolding without reheating up to −22° C.).

The pure polyols have very high viscosities with respect to water (the ratio of the viscosities is greater than 1000). This ratio remains about 20 for the eutectic mixtures. Because of this viscosity, the mixture sprayed in this way flows very slightly by gravity into the mold 10 at the implementational temperature of the method which, at this stage, is less than −10° C. In this way, the inner faces of the mold are suitably coated by this mixture until the coating sorbet 8 is put in place. The glycerol solution may be introduced in excess into the mold without being detrimental to the demolding. When each mold 10 is used several times in a row, it is noticed that the amount of solution to be sprayed at each turn may be less than 2 g and, for example, less than 1 g.

With reference to FIG. 2, the mold then enters the tunnel 24 where it is cooled to −27° C.

Next, the first sorbet 8, or coating sorbet, stored at +3° C. before dosing, is inserted into the mold 10 in the liquid state, as illustrated in FIG. 3. This dosing takes place in the tunnel 24 at the dosing station 30. At this station, the mold is filled with the first liquid sorbet 8 up to the lower edge of the skirt 18.

With reference to FIG. 4, this sorbet 8 comes in contact with the fine film of glycerol solution covering the entire inner face of the mold. Given the temperature of the mold 10, the sorbet G solidifies close to the walls of the mold and forms a solid shell covering these walls internally, the center of the contents of the mold remaining liquid, as illustrated in FIG. 4.

With reference to FIG. 5, the mold then exits from the tunnel 24 and passes opposite a station 32 where the liquid core of the contents of the mold is sucked out by a vacuum pump 33, leaving only the hardened shell in the mold.

With reference to FIG. 6, the mold then passes opposite the station 34 for dosing the second sorbet 6 or the inner sorbet. The mold is then filled up to the lower edge of the skirt 18. The dosage takes place by means of a nozzle 35 which enters the mold down to the immediate vicinity of the lower bottom, for example to mm therefrom, and releases the sorbet while rising up to its mold exit.

With reference to FIG. 7, the mold then passes opposite a station 36 for inserting a stick 4 placed in the central sorbet 6 through the skirt 18.

As illustrated in FIG. 8, a small amount of the first liquid 8 is again inserted into the mold 10 at the station 38 so that the skirt 18 is partially filled and the central sorbet 6 is enclosed in the outer sorbet 8.

The molds then pass through the second tunnel 26 where they are cooled to −31° C., then travel the route separating the two tunnels again to return to the tunnel 24 in order to be refrigerated, as illustrated in FIG. 9. At the exit of the tunnel 24, the central sorbet is itself also completely crystallized.

At the exit of the second tunnel 26, the molds 10 pass opposite a reheating station 38, as illustrated in FIG. 10, comprising turbines 39 which blow hot air over the molds 10 so that, for example, during the subsequent opening of the mold, its temperature at its outer surface is −19° C. and that the iced lolly is at −26° C. at the center. These reheating conditions do not generate any melting of the iced lolly on the surface, thus keeping the definition of the reliefs thereon. During demolding, at least a fraction of the glycerol mixture is liquid but the two sorbets remain completely solid.

Next, the molds 10 pass to the station 40, illustrated in FIG. 11, where the mold is opened and the iced lolly 2 is extracted from the mold by a suitable grasping device known per se.

The empty mold again then passes in front of the spraying station 20 for the manufacture of another iced lolly.

The method according to the invention makes it possible to avoid causing thermal shock prior to the demolding and/or during the latter. Since reheating by water is not required in order to provide a large amount of heat, it makes it possible to eliminate the risks of, spraying water on the product, which reduces the subsequent formation of frost.

Furthermore, sending a large amount of water over the outside of the molds for the purposes of reheating usually presents problems of hygiene and creates a cold and damp environment which is difficult for the operators to withstand.

The temperatures associated with the method (close to −30° C. and even above −30° C.) allow its industrial implementation under usual working conditions on the cold food lines.

The method according to the invention makes it possible to carry out demolding at mold-temperatures situated, for example, between −30° C. and −10° C. It makes it possible to form iced lollies having relief or hollow designs defined with very great accuracy.

When introducing the coating sorbet 8 into the mold, part of the demolding mixture 23 often mixes with the coating sorbet 8. However, a significant fraction of the unmixed part of demolding mixture 23 remains liquid, thus ensuring demolding.

The method according to the invention does not generate a glycerol mixture amalgam 23 on the iced lolly after demolding. All that happens is that the latter has a few traces of the mixture 23 on the outside, not altering the appearance of the coating sorbet. The glycerol solution 23 does not alter the taste of the coating sorbet 8 even if a fraction of this solution is mixed with the sorbet during the manufacture.

The very low temperature of the product 2 at the end of the manufacture makes it very hard and limits its deformation during subsequent packaging, storage and transport phases.

The method according to the invention limits the formation of ice crystals on the product during its various handling operations and until the final consumption by the purchaser, which preserves the appearance of the product.

It will be possible to replace the glycerol by another polyol such as sorbitol or maltitol. Thus, an aqueous solution of sorbitol, in which the latter forms 70% by mass of the solution, allows demolding without reheating over a temperature range having a lower limit of −41° C. With maltitol dosed at 75% in solution, this limit is −35° C.

It will be possible to implement the method by means of the glycerol solution at a temperature of −30° C. and without reheating the mold before demolding, for example by increasing the amount of solution sprayed.

The method according to the invention can serve to manufacture iced products, especially sweet products with a sorbet and/or ice cream base.

What is claimed is:

1. A method of producing an iced food product, comprising the steps of:
    depositing, on an inner face of a mold, a mixture consisting of water and a polyol;
    placing a substance forming the food product in contact with the mixture in the mold; and
    molding the food product to produce an iced food product.

2. The method as claimed in claim 1, wherein the polyol is selected from the group consisting of glycerol, maltilol and sorbitol.

3. The method as claimed in claim 1, wherein the mixture is deposited by spraying.

4. The method as claimed in claim 1, wherein the substance is placed in the mold in the liquid state.

5. The method as claimed in claim 1, wherein the iced food product is of the type which melts at room temperature.

6. The method as claimed in claim 1, wherein the iced food product is a sweet product with a sorbet or ice cream base.

7. A method of producing an iced food product, comprising the steps of:
    depositing, on an inner face of a mold, a mixture consisting of water and a polyol, the mixture comprising a mass percentage of between 0.8x and 1.2x of the polyol where x is the mass percentage of the polyol in a eutectic mixture of the polyol and water;
    placing a substance forming the food product in contact with the mixture in the mold; and
    molding the food product to produce an iced food product.

8. The method as claimed in claim 7, wherein the mixture is a eutectic mixture.

9. The method as claimed in claim 7, wherein the mixture is a eutectic mixture of water and of glycerol.

10. A method of producing an iced food product, comprising the steps of:
    depositing, on an inner face of a mold, a mixture consisting of water and a polyol, the mixture comprising a mass percentage of between 0.8x and 1.2x of the polyol where x is the mass percentage of the polyol in a eutectic mixture of the polyol and water;

placing a substance forming the food product in contact with the mixture in the mold; and molding the food product to produce an iced food product;

and wherein the product is given a demolding temperature such that, when the product is being demolded, the mixture is at least partly liquid and the substance is completely solid.

11. The method as claimed in claim 10, wherein the demolding temperature is less than 0° C.

12. The method as claimed in claim 10, wherein the demolding temperature is less than −5° C.

13. The method as claimed in claim 10, wherein the demolding temperature is less than −10° C.

14. The method as claimed in claim 10, wherein the demolding temperature is less than −15° C.

15. The method as claimed in claim 10, wherein at least part of the product is produced at a production temperature less than the demolding temperature.

16. The method as claimed in claim 15, wherein the production temperature is less than −15° C.

17. The method as claimed in claim 15, wherein the production temperature is less than −25° C.

18. The method as claimed in claim 10, wherein the mixture is a eutectic mixture.

19. The method as claimed in claim 10, wherein the polyol is selected from the group consisting of glycerol, maltitol and sorbitol.

20. The method as claimed in claim 10, wherein the iced food product is a sweet product with a sorbet or ice cream base.

* * * * *